(12) United States Patent
Yoshinaga et al.

(10) Patent No.: US 12,061,376 B2
(45) Date of Patent: Aug. 13, 2024

(54) IMAGING OPTICAL SYSTEM, AND IMAGE CAPTURE DEVICE AND CAMERA SYSTEM USING THE IMAGING OPTICAL SYSTEM

(71) Applicant: Panasonic Intellectual Property Management Co., Ltd., Osaka (JP)

(72) Inventors: Shunichiro Yoshinaga, Osaka (JP); Yasuto Suzuki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 800 days.

(21) Appl. No.: 17/280,030

(22) PCT Filed: Jan. 24, 2020

(86) PCT No.: PCT/JP2020/002591
§ 371 (c)(1),
(2) Date: Mar. 25, 2021

(87) PCT Pub. No.: WO2020/158622
PCT Pub. Date: Aug. 6, 2020

(65) Prior Publication Data
US 2022/0035124 A1    Feb. 3, 2022

(30) Foreign Application Priority Data
Jan. 28, 2019    (JP) .................... 2019-011795

(51) Int. Cl.
G02B 15/14    (2006.01)
G02B 7/14    (2021.01)
G02B 7/28    (2021.01)

(52) U.S. Cl.
CPC ............. *G02B 7/282* (2013.01); *G02B 7/14* (2013.01); *G02B 15/1461* (2019.08)

(58) Field of Classification Search
CPC ........ G02B 7/282; G02B 7/14; G02B 15/1461
See application file for complete search history.

(56) References Cited

U.S. PATENT DOCUMENTS

| | | |
|---|---|---|
| 2016/0178875 A1 | 6/2016 | Matsumura et al. |
| 2016/0356986 A1 | 12/2016 | Sun |
| 2019/0004278 A1 | 1/2019 | Hosoi |

FOREIGN PATENT DOCUMENTS

| | | |
|---|---|---|
| JP | 2016-118770 | 6/2016 |
| JP | 2017-3678 | 1/2017 |

(Continued)

OTHER PUBLICATIONS

International Search Report issued Mar. 17, 2020 in corresponding International Application No. PCT/JP2020/002591.

*Primary Examiner* — Wen Huang
(74) *Attorney, Agent, or Firm* — Wenderoth, Lind & Ponack, L.L.P.

(57) ABSTRACT

An imaging optical system includes: a front group having positive power; an aperture stop; a single lens Fn arranged adjacent to the aperture stop and having negative power; and a rear group having power. The front group includes: a first lens having positive power; a second lens having negative power; and a lens LG1R having positive power. The rear group includes a lens LGnR having negative power and located closest to the image. While focusing to make a transition from an infinity in-focus state to a close-object in-focus state, neither the front group nor the rear group moves but the single lens Fn moves along an optical axis toward the image. The imaging optical system satisfies the inequality: 0.38<fLG1R/fG1<1.75, where fG1 is a focal length of the front group and fLG1R is a focal length of the lens LG1R.

11 Claims, 10 Drawing Sheets

(56) References Cited

FOREIGN PATENT DOCUMENTS

| | | |
|---|---|---|
| JP | 2017-122861 | 7/2017 |
| JP | 2018-189878 | 11/2018 |
| WO | 2017/138250 | 8/2017 |

IMAGING OPTICAL SYSTEM, AND IMAGE CAPTURE DEVICE AND CAMERA SYSTEM USING THE IMAGING OPTICAL SYSTEM

CROSS-REFERENCE TO RELATED APPLICATIONS

The present application is the U.S. National Phase under 35 U.S.C. § 371 of International Application No. PCT/JP2020/002591, filed on Jan. 24, 2020, which claims priority to Japanese Patent Application No. 2019-011795, filed on Jan. 28, 2019, the entire contents of which are incorporated herein by reference.

TECHNICAL FIELD

The present disclosure generally relates to a single-focus imaging optical system with high-speed autofocus capability and also relates to an image capture device and camera system using such an imaging optical system.

BACKGROUND ART

Patent Literature 1 discloses an imaging lens suitably used as a large-aperture imaging lens for a lens-interchangeable digital camera system and an image capture device including such an imaging lens.

Patent Literature 2 discloses a lens system, an interchangeable lens unit, and a camera system with the ability to reduce aberrations.

CITATION LIST

Patent Literature

Patent Literature 1: WO 2017/138250 A1
Patent Literature 2: JP 2016-118770 A

SUMMARY OF INVENTION

It is therefore an object of the present disclosure to provide an imaging optical system having a large aperture and yet having not only the ability to form a sharp image from an infinity through a shortest shooting range but also high-speed autofocus capability and also provide an image capture device and camera system using such an imaging optical system.

An imaging optical system according to the present disclosure includes: a front group having positive power; an aperture stop; a single lens Fn arranged adjacent to the aperture stop and having negative power; and a rear group having power. The front group, the aperture stop, the single lens Fn, and the rear group are arranged in this order such that the front group is located closer to an object than any of the aperture stop, the single lens Fn, or the rear group is and that the rear group is located closer to an image than any of the front group, the aperture stop, or the single lens Fn is. The front group includes: a first lens having positive power; a second lens having negative power; and a lens LG1R having positive power. The first lens, the second lens, and the lens LG1R are arranged in this order such that the first lens is located closest to the object and that the lens LG1R is located closest to the image. The rear group includes a lens LGnR having negative power and located closest to the image. While the imaging optical system is focusing to make a transition from an infinity in-focus state to a close-object in-focus state, neither the front group nor the rear group moves but the single lens Fn moves along an optical axis toward the image. The imaging optical system satisfies 0.38<0.38<fLG1R/fG1<1.75, where fG1 is a focal length of the front group and fLG1R is a focal length of the lens LG1R.

A camera system according to the present disclosure includes: an interchangeable lens unit including the imaging optical system described above; and a camera body including an image sensor to receive an optical image formed by the imaging optical system and transform the optical image into an electrical image signal. The camera body is to be connected removably to the interchangeable lens unit via a camera mount. The interchangeable lens unit forms the optical image of the object on the image sensor.

An image capture device according to the present disclosure is configured to transform an optical image of an object into an electrical image signal and display and/or store the image signal transformed. The image capture device includes: the imaging optical system described above to form the optical image of the object; and an image sensor to transform the optical image formed by the imaging optical system into the electrical image signal.

DESCRIPTION OF EMBODIMENTS

Figure 1:
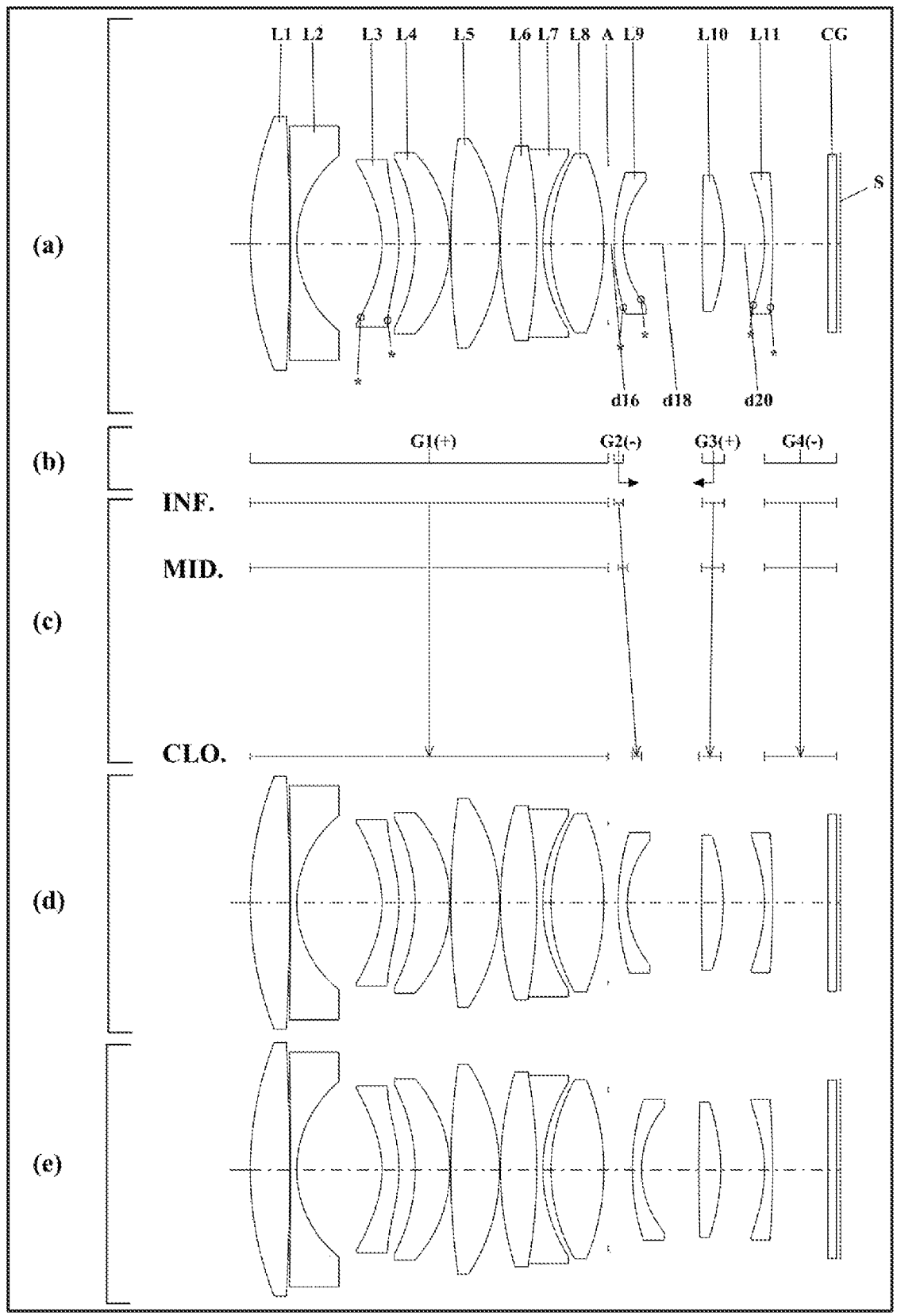
FIG. 1 illustrates lens arrangement diagrams showing an infinity in-focus state, a close-object in-focus state, and a middle position in-focus state of an imaging optical system according to a first embodiment.
Figure 2:
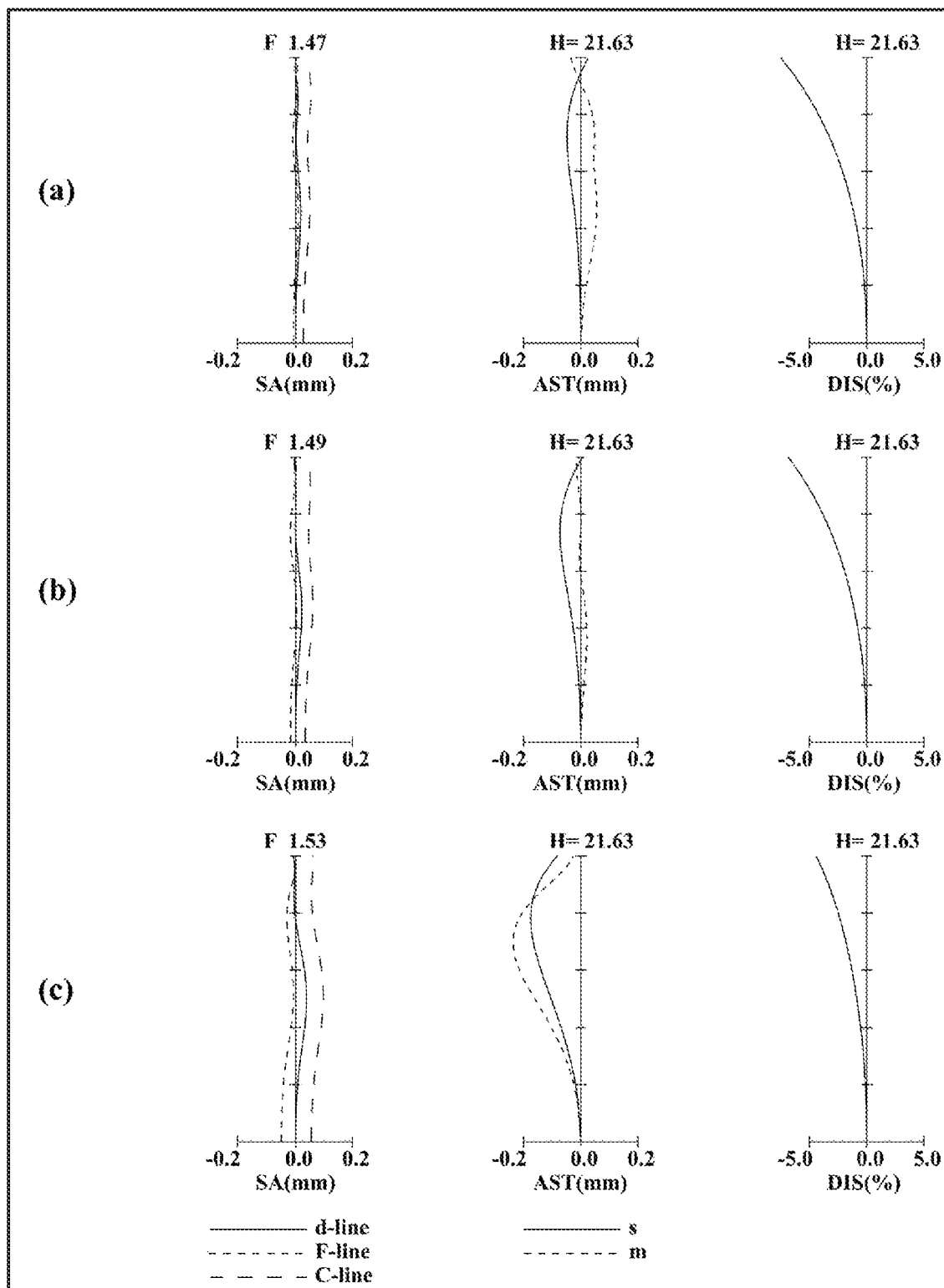
FIG. 2 illustrates longitudinal aberration diagrams showing the infinity in-focus state, the close-object in-focus state, and the middle position in-focus state of an imaging optical system according to a first example of numerical values corresponding to the first embodiment.

Embodiments of the present disclosure will be described in detail with reference to the accompanying drawings. Note that unnecessarily detailed description may be omitted. For example, detailed description of already well-known matters and redundant description of substantially the same configuration may be omitted. This is done to avoid making the following description overly redundant and to help one of ordinary skill in the art understand the present disclosure.

In addition, note that the applicant provides the accompanying drawings and the following description to help one of ordinary skill in the art understand the present disclosure fully and those drawings and the following description should not be construed as limiting the scope of the present disclosure, which is defined by the appended claims.

(Findings that Form the Basis of the Present Disclosure)

A known large-aperture imaging optical system has so large an entrance pupil that light rays that pass through a plurality of lenses that form the imaging optical system are consistently high. To allow those light rays to pass without being cut off, those lenses that form the imaging optical system cannot help having their diameter increased. Therefore, even if an imaging optical system is configured to perform focusing using only one single lens to realize high-speed and silent focusing and to reduce the weight of a group of focus lenses, the lens to actuate also comes to have a rather heavy weight.

In addition, since the light rays passing through the respective lenses have a significant light ray height, the aberrations produced on respective lens surfaces are also consistently significant. Therefore, it is difficult to compensate for aberrations within the group of focus lenses by performing focusing using only one single lens. That is why the performance inevitably varies in the range from an infinity focus point through a close range, and therefore, it is difficult to maintain good performance in the entire in-focus object distance range.

Thus, to overcome this problem, the present inventors acquired a basic idea of our invention in providing an optical system including a large-aperture lens but having the capability of performing focusing using a single lens with a small aperture by intentionally providing a range with a narrow light ray passage area within the optical system and giving a focusing capability to a lens arranged in that range.

First to Fourth Embodiments

FIGS. 1, 3, 5, and 7 illustrate lens arrangement diagrams according to first, second, third, and fourth embodiments and their operations.

In FIGS. 1, 3, 5, and 7, portion (a) illustrates a lens arrangement diagram in an infinity in-focus state, portion (d) illustrates a lens arrangement diagram in a middle-position in-focus state, and portion (e) illustrates a lens arrangement diagram in a close-object in-focus state. In portions (a), (d), and (e) of each of FIGS. 1, 3, 5, and 7, the straight line drawn at the right end indicates the position of an image plane S (corresponding to a surface which faces an object and on which an image sensor is arranged as will be described later). Thus, in each of these drawings, the left side corresponds to the object side. In addition, a low-pass filter or parallel flat glass CG such as cover glass is arranged between the last-stage lens group facing the image plane S and the image plane S. Note that portions (a), (d), and (e) of FIGS. 1, 3, 5, and 7 have the same aspect ratio.

Also, in portion (a) of each of FIGS. 1, 3, 5, and 7, the asterisk (*) attached to the surface of a particular lens indicates that the surface is an aspheric surface.

Furthermore, in portion (b) of each of FIGS. 1, 3, 5, and 7, the positions corresponding to the respective lens groups shown in portion (a) are given reference signs G1-G3 or G1-G4. Furthermore, the signs (+) and (−) added to the reference signs (G1-G4) of the respective lens groups indicate the powers of the respective lens groups. Specifically, the sign (+) indicates positive power and the sign (−) indicates negative power. Furthermore, an arrow indicating the direction of movement involved with focusing to make a transition from the infinity in-focus state to the close-object in-focus state is added under the reference sign of a particular lens group.

Furthermore, the arrows shown in portion (c) of each of FIGS. 1, 3, 5, and 7 indicate, from top to bottom, the respective positions of the lens groups in the infinity in-focus (INF.) state, the middle-position in-focus (MID.) state, and the close-object in-focus (CLO.) state by connecting those positions together with lines. Note that those arrows also indicate an intermediate state between the infinity in-focus state and the middle-position in-focus state and an intermediate state between the middle-position in-focus state and the close-object in-focus state for convenience sake.

First Embodiment

An imaging optical system according to a first embodiment will be described with reference to FIG. 1.

FIG. 1 illustrates lens arrangement diagrams showing the infinity in-focus state, the close-object in-focus state, and the middle-position in-focus state of an imaging optical system according to the first embodiment and their operations.

As shown in FIG. 1, the imaging optical system according to this embodiment includes a first lens group G1 having positive power, an aperture stop A, a second lens group G2 having negative power, a third lens group G3 having positive power, a fourth lens group G4 having negative power, and parallel flat glass CG which are arranged in this order such that the first lens group G1 is located closer to an object than any of the aperture stop A, the second lens group G2, the third lens group G3, the fourth lens group G4, or the parallel flat glass CG and that the parallel flat glass CG is located closer to the image than any of the first lens group G1, the aperture stop A, the second lens group G2, the third lens group G3, or the fourth lens group G4. The first lens group G1 is an example of the front group. The fourth lens group G4 is an example of the rear group.

The first lens group G1 includes: a first lens L1 having positive power; a second lens L2 having negative power; a third lens L3 having negative power; a fourth lens L4 having positive power; a fifth lens L5 having positive power; a sixth lens L6 having positive power; a seventh lens L7 having negative power; and an eighth lens L8 having positive power, which are arranged in this order such that the first lens L1 is located closer to the object than any other member of the first lens group G1 and that the eighth lens L8 is located closer to the image than any other member of the first lens group G1.

The sixth lens L6 and the seventh lens L7 together form a bonded lens when bonded together with an adhesive such as an ultraviolet-curable resin. The eighth lens L8 is an example of the lens LG1R.

The second lens group G2 includes a ninth lens L9 having negative power. The ninth lens L9 is an example of the single lens Fn.

The third lens group G3 includes a tenth lens L10 having positive power. The tenth lens L10 is an example of the single lens Fp or the positive lens Lp.

The fourth lens group G4 includes an eleventh lens L11 having negative power. The eleventh lens L11 is an example of the lens LGnR.

The respective lenses that form these lens groups of the imaging optical system according to this embodiment will be described.

First, the respective lenses that form the first lens group G1 will be described.

The first lens L1 is a biconvex lens. The second lens L2 is a biconcave lens. The third lens L3 is a meniscus lens with a convex surface facing the image, and both surfaces thereof are aspheric surfaces. The fourth lens L4 is a meniscus lens with a convex surface facing the image. The fifth lens L5 is a biconvex lens. The sixth lens L6 is a biconvex lens. The seventh lens L7 is a biconcave lens. The eighth lens L8 is a biconvex lens.

Next, the lens included in the second lens group G2 will be described.

The ninth lens L9 is a meniscus lens with a convex surface facing the object and both surfaces thereof are aspheric surfaces.

Next, the lens included in the third lens group G3 will be described.

The tenth lens L10 is a biconvex lens.

Next, the lens included in the fourth lens group G4 will be described.

The eleventh lens L11 is a meniscus lens with a convex surface facing the image and both surfaces thereof are aspheric surfaces.

While the imaging optical system according to this embodiment is focusing to make a transition from the infinity in-focus state to the close-object in-focus state, the first lens group G1 does not move, the aperture stop A does not move, either, the ninth lens L9 of the second lens group G2 moves along the optical axis toward the image, the tenth lens L10 of the third lens group G3 moves along the optical axis toward the object, and the fourth lens group G4 does not move.

That is to say, the imaging optical system performs focusing with the intervals between the respective lens groups changed.

Second Embodiment

An imaging optical system according to a second embodiment will be described with reference to FIG. 3.

Figure 3:
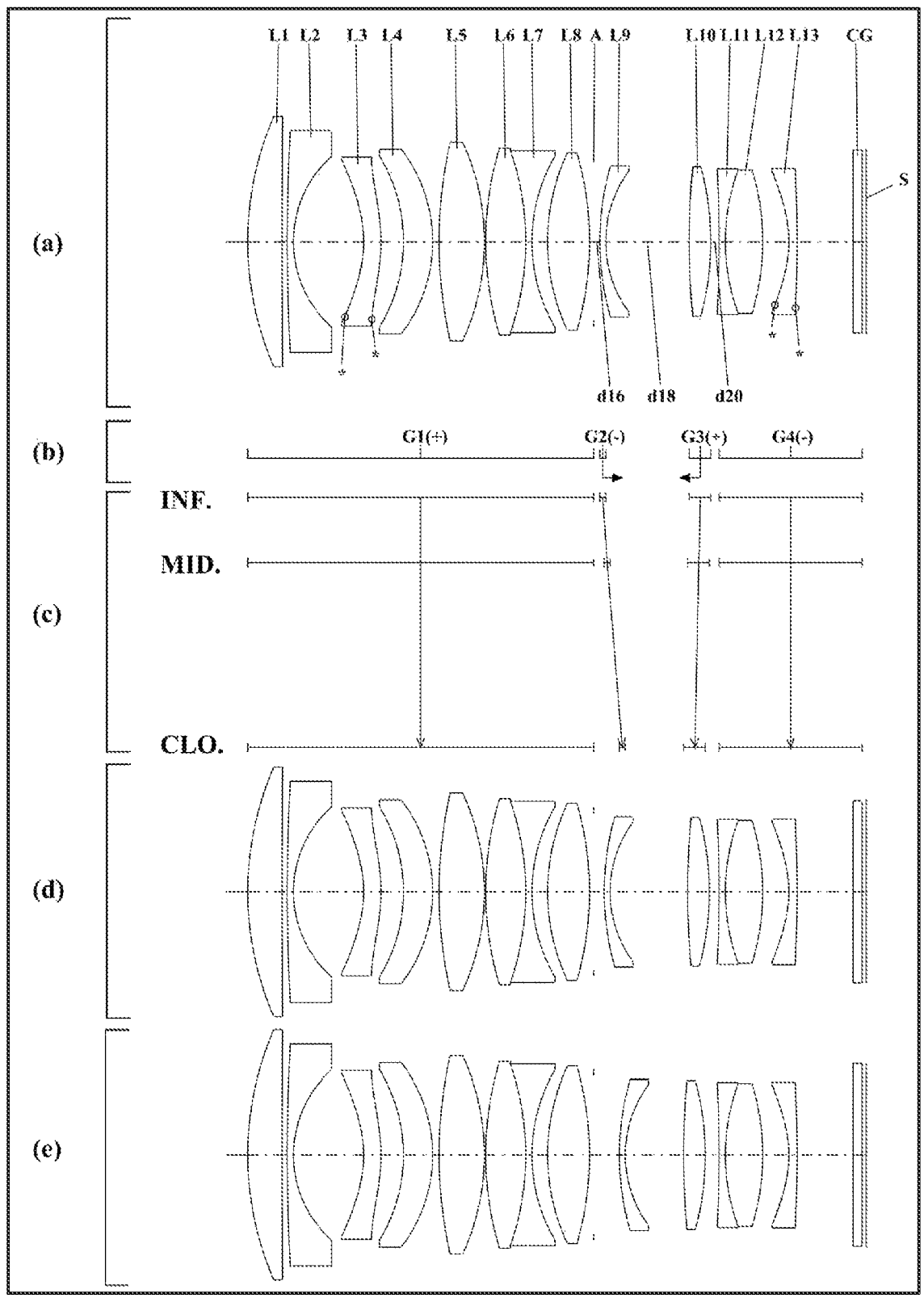
FIG. 3 illustrates lens arrangement diagrams showing an infinity in-focus state, a close-object in-focus state, and a middle position in-focus state of an imaging optical system according to a second embodiment.
Figure 4:
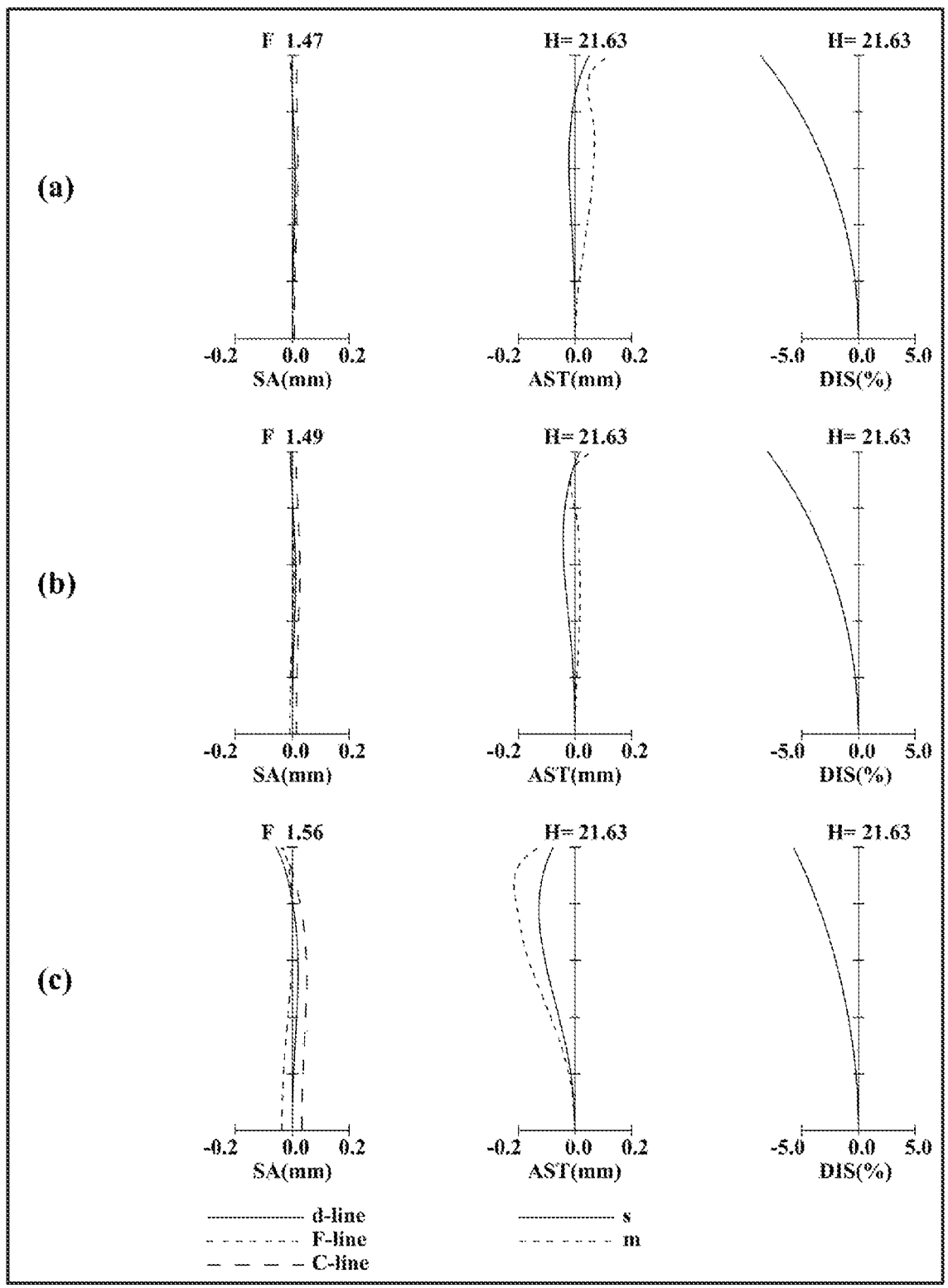
FIG. 4 illustrates longitudinal aberration diagrams showing the infinity in-focus state, the close-object in-focus state, and the middle position in-focus state of an imaging optical system according to a second example of numerical values corresponding to the second embodiment.

FIG. 3 illustrates lens arrangement diagrams showing the infinity in-focus state, the close-object in-focus state, and the middle-position in-focus state of an imaging optical system according to the second embodiment and their operations.

As shown in FIG. 3, the imaging optical system according to this embodiment includes a first lens group G1 having positive power, an aperture stop A, a second lens group G2 having negative power, a third lens group G3 having positive power, and a fourth lens group G4 having negative power, which are arranged in this order such that the first lens group G1 is located closer to an object than any of the aperture stop A, the second lens group G2, the third lens group G3, or the fourth lens group G4 and that the fourth lens group G4 is located closer to the image than any of the first lens group G1, the aperture stop A, the second lens group G2, or the third lens group G3. The first lens group G1 is an example of the front group. The fourth lens group G4 is an example of the rear group.

The first lens group G1 includes: a first lens L1 having positive power; a second lens L2 having negative power; a third lens L3 having negative power; a fourth lens L4 having positive power; a fifth lens L5 having positive power; a sixth lens L6 having positive power; a seventh lens L7 having negative power; and an eighth lens L8 having positive power, which are arranged in this order such that the first lens L1 is located closer to the object than any other member of the first lens group G1 and that the eighth lens L8 is located closer to the image than any other member of the first lens group G1.

The sixth lens L6 and the seventh lens L7 together form a bonded lens when bonded together with an adhesive such as an ultraviolet-curable resin. The eighth lens L8 is an example of the lens LG1R.

The second lens group G2 includes a ninth lens L9 having negative power. The ninth lens L9 is an example of the single lens Fn.

The third lens group G3 includes a tenth lens L10 having positive power. The tenth lens L10 is an example of the single lens Fp or the positive lens Lp.

The fourth lens group G4 includes: an eleventh lens L11 having negative power; a twelfth lens L12 having positive power; and a thirteenth lens L13 having negative power, which are arranged in this order such that the eleventh lens L11 is located closer to the object than any other member of the fourth lens group G4 and that the thirteenth lens L13 is located closer to the image than any other member of the fourth lens group G4. The eleventh lens L11 and the twelfth lens L12 together form a bonded lens when bonded together with an adhesive such as an ultraviolet-curable resin. The thirteenth lens L13 is an example of the lens LGnR.

Next, the respective lenses that form these lens groups of the imaging optical system according to this embodiment will be described.

First, the respective lenses that form the first lens group G1 will be described.

The first lens L1 is a meniscus lens with a convex surface facing the object. The second lens L2 is a meniscus lens with a convex surface facing the object. The third lens L3 is a meniscus lens with a convex surface facing the image, and both surfaces thereof are aspheric surfaces. The fourth lens L4 is a meniscus lens with a convex surface facing the image. The fifth lens L5 is a biconvex lens. The sixth lens L6 is a biconvex lens. The seventh lens L1 is a biconcave lens. The eighth lens L8 is a biconvex lens.

Next, the lens included in the second lens group G2 will be described.

The ninth lens L9 is a meniscus lens with a convex surface facing the object.

Next, the lens included in the third lens group G3 will be described.

The tenth lens L10 is a biconvex lens.

Next, the lenses that form the fourth lens group G4 will be described.

The eleventh lens L11 is a biconcave lens. The twelfth lens L12 is a biconvex lens. The thirteenth lens L13 is a meniscus lens with a convex surface facing the object and both surfaces thereof are aspheric surfaces.

While the imaging optical system according to this embodiment is focusing to make a transition from the infinity in-focus state to the close-object in-focus state, the first lens group G1 does not move, the aperture stop A does not move, either, the ninth lens L9 of the second lens group G2 moves along the optical axis toward the image, the tenth lens L10 of the third lens group G3 moves along the optical axis toward the object, and the fourth lens group G4 does not move.

That is to say, the imaging optical system performs focusing with the intervals between the respective lens groups changed.

Third Embodiment

An imaging optical system according to a third embodiment will be described with reference to FIG. 5.

Figure 5:
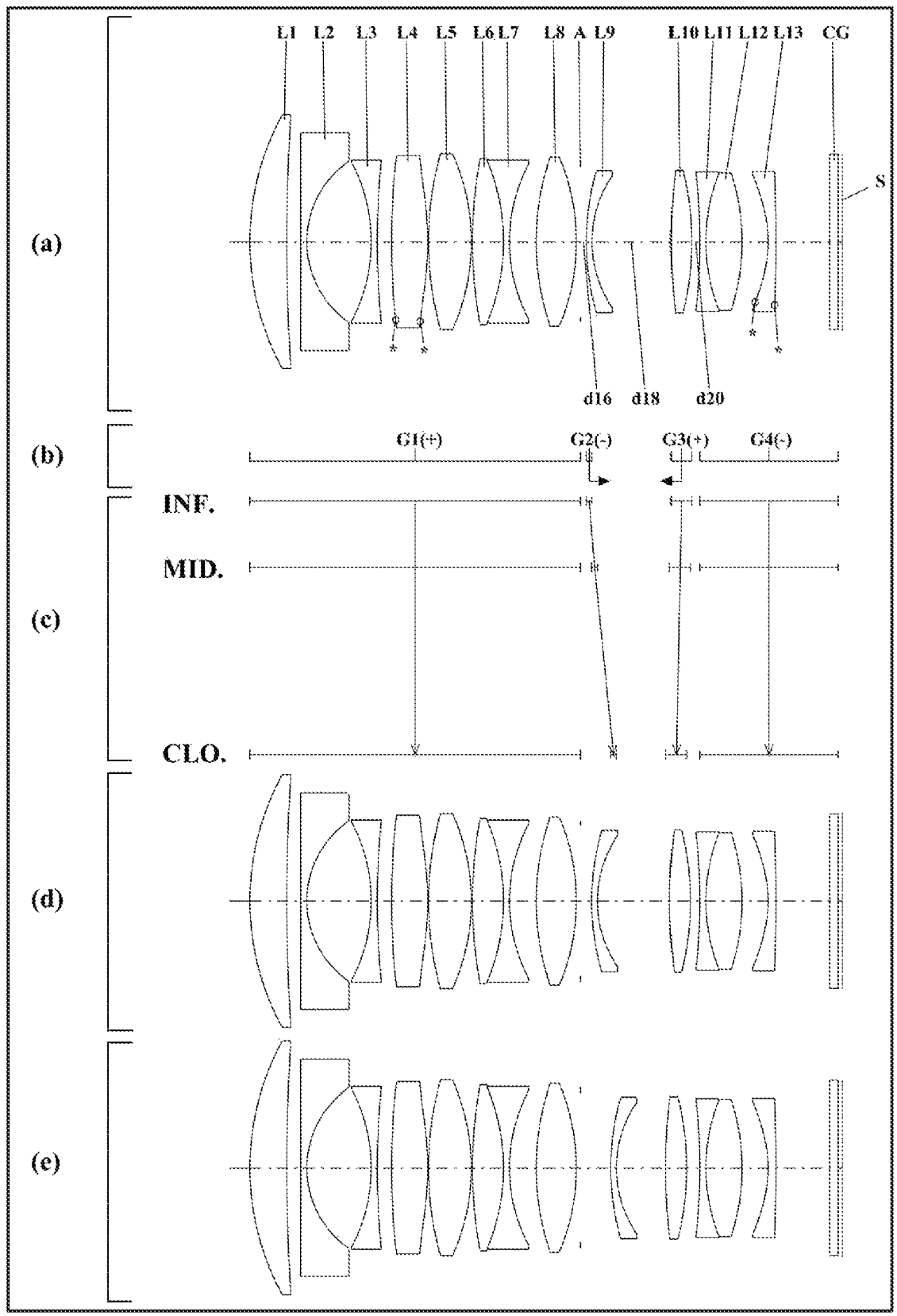
FIG. 5 illustrates lens arrangement diagrams showing an infinity in-focus state, a close-object in-focus state, and a middle position in-focus state of an imaging optical system according to a third embodiment.
Figure 6:
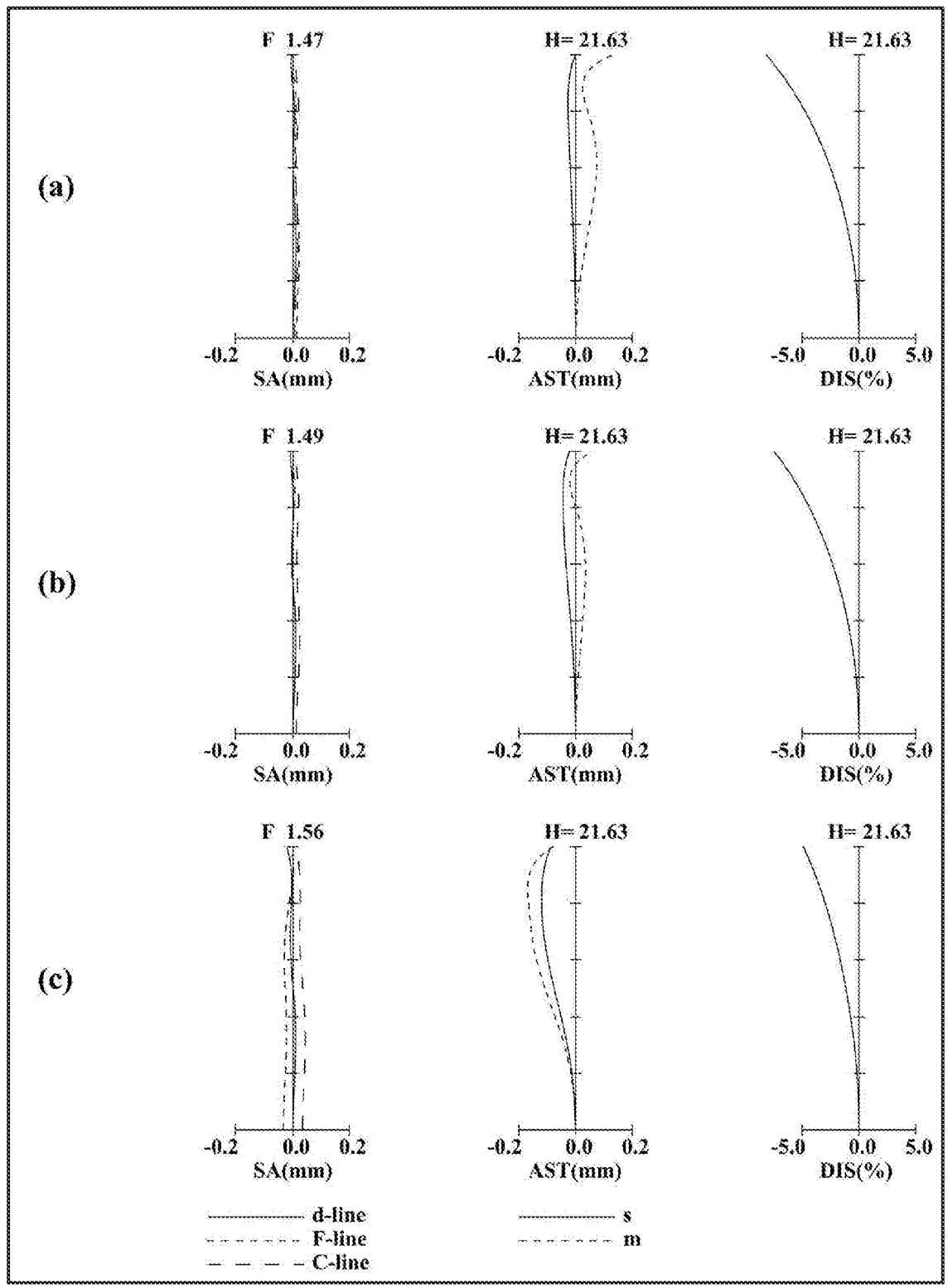
FIG. 6 illustrates longitudinal aberration diagrams showing the infinity in-focus state, the close-object in-focus state, and the middle position in-focus state of an imaging optical system according to a third example of numerical values corresponding to the third embodiment.

FIG. 5 illustrates lens arrangement diagrams showing the infinity in-focus state, the close-object in-focus state, and the middle position in-focus state of an imaging optical system according to the third embodiment and their operations.

As shown in FIG. 5, the imaging optical system according to this embodiment includes a first lens group G1 having positive power, an aperture stop A, a second lens group G2 having negative power, a third lens group G3 having positive power, and a fourth lens group G4 having negative power, which are arranged in this order such that the first lens group G1 is located closer to an object than any of the aperture stop A, the second lens group G2, the third lens group G3, or the fourth lens group G4 and that the fourth lens group G4 is located closer to the image than any of the first lens group G1, the aperture stop A, the second lens group G2, or the third lens group G3. The first lens group G1 is an example of the front group. The fourth lens group G4 is an example of the rear group.

The first lens group G1 includes: a first lens L1 having positive power; a second lens L2 having negative power; a third lens L3 having negative power; a fourth lens L4 having positive power; a fifth lens L5 having positive power; a sixth lens L6 having positive power; a seventh lens L7 having negative power; and an eighth lens L8 having positive power, which are arranged in this order such that the first lens L1 is located closer to the object than any other member of the first lens group G1 and that the eighth lens L8 is located closer to the image than any other member of the first lens group G1.

The sixth lens L6 and the seventh lens L7 together form a bonded lens when bonded together with an adhesive such as an ultraviolet-curable resin. The eighth lens L8 is an example of the lens LG1R.

The second lens group G2 includes a ninth lens L9 having negative power.

The ninth lens L9 is an example of the single lens Fn.

The third lens group G3 includes a tenth lens L10 having positive power. The tenth lens L10 is an example of the single lens Fp or the positive lens Lp.

The fourth lens group G4 includes: an eleventh lens L11 having negative power; a twelfth lens L12 having positive power; and a thirteenth lens L13 having negative power, which are arranged in this order such that the eleventh lens L11 is located closer to the object than any other member of the fourth lens group G4 and that the thirteenth lens L13 is located closer to the image than any other member of the fourth lens group G4.

The eleventh lens L11 and the twelfth lens L12 together form a bonded lens when bonded together with an adhesive such as an ultraviolet-curable resin. The thirteenth lens L13 is an example of the lens LGnR.

Next, the respective lenses that form these lens groups of the imaging optical system according to this embodiment will be described.

First, the respective lenses that form the first lens group G1 will be described.

The first lens L1 is a meniscus lens with a convex surface facing the object. The second lens L2 is a biconcave lens. The third lens L3 is a biconcave lens. The fourth lens L4 is a biconvex lens, and both surfaces thereof are aspheric surfaces. The fifth lens L5 is a biconvex lens. The sixth lens L6 is a biconvex lens. The seventh lens L7 is a biconcave lens. The eighth lens L8 is a biconvex lens.

Next, the lens included in the second lens group G2 will be described.

The ninth lens L9 is a meniscus lens with a convex surface facing the object.

Next, the lens included in the third lens group G3 will be described.

The tenth lens L10 is a biconvex lens.

Next, the lenses that form the fourth lens group G4 will be described.

The eleventh lens L11 is a biconcave lens. The twelfth lens L12 is a biconvex lens. The thirteenth lens L13 is a meniscus lens with a convex surface facing the object and both surfaces thereof are aspheric surfaces.

While the imaging optical system according to this embodiment is focusing to make a transition from the infinity in-focus state to the close-object in-focus state, the first lens group G1 does not move, the aperture stop A does not move, either, the second lens group G2 moves along the optical axis toward the image, the third lens group G3 moves along the optical axis toward the object, and the fourth lens group G4 does not move.

That is to say, the imaging optical system performs focusing with the intervals between the respective lens groups changed.

Fourth Embodiment

An imaging optical system according to a fourth embodiment will be described with reference to FIG. 7.

Figure 7:
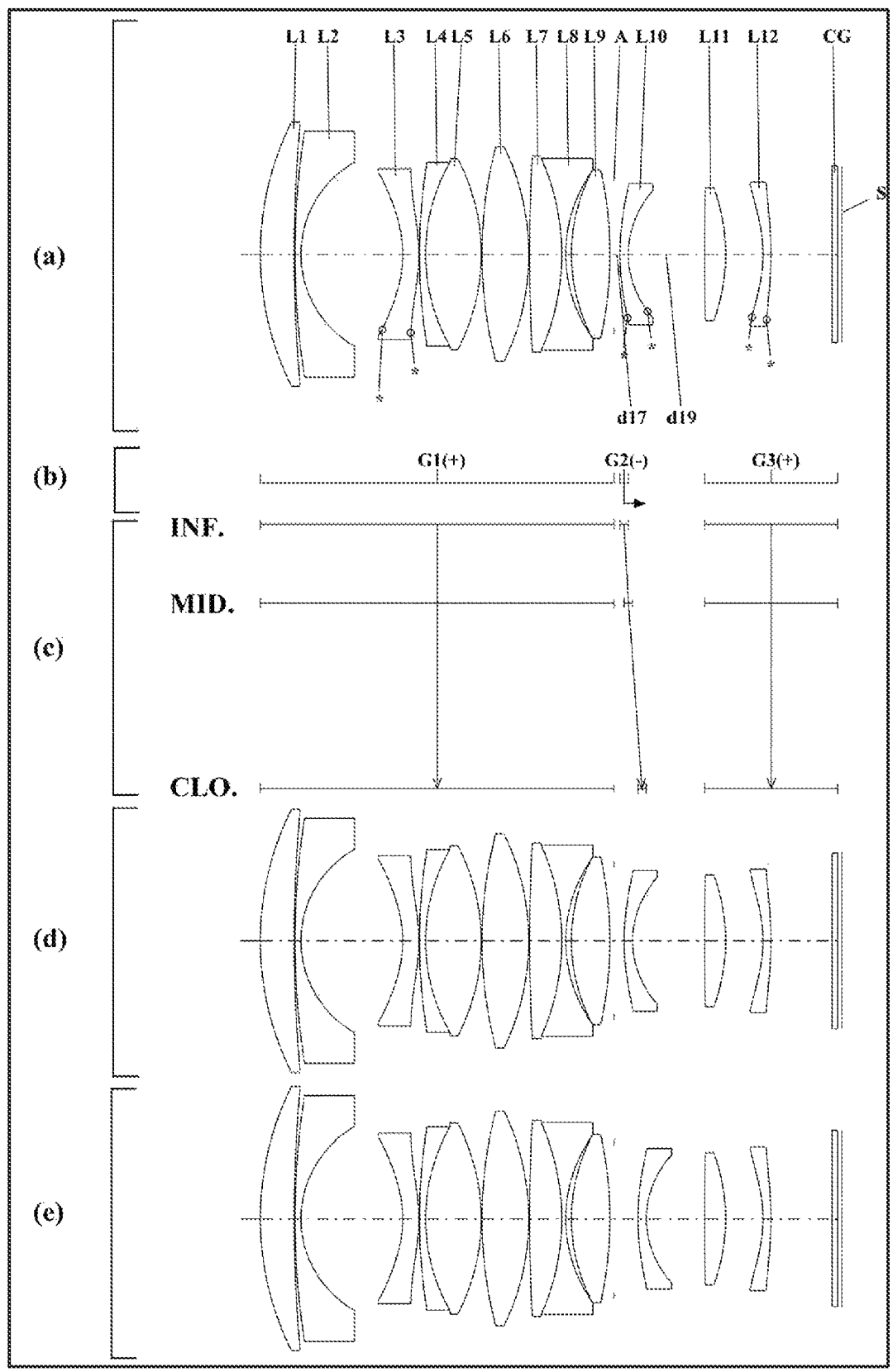
FIG. 7 illustrates lens arrangement diagrams showing the infinity in-focus state, the close-object in-focus state, and the middle position in-focus state of the imaging optical system according to a fourth embodiment.
Figure 8:
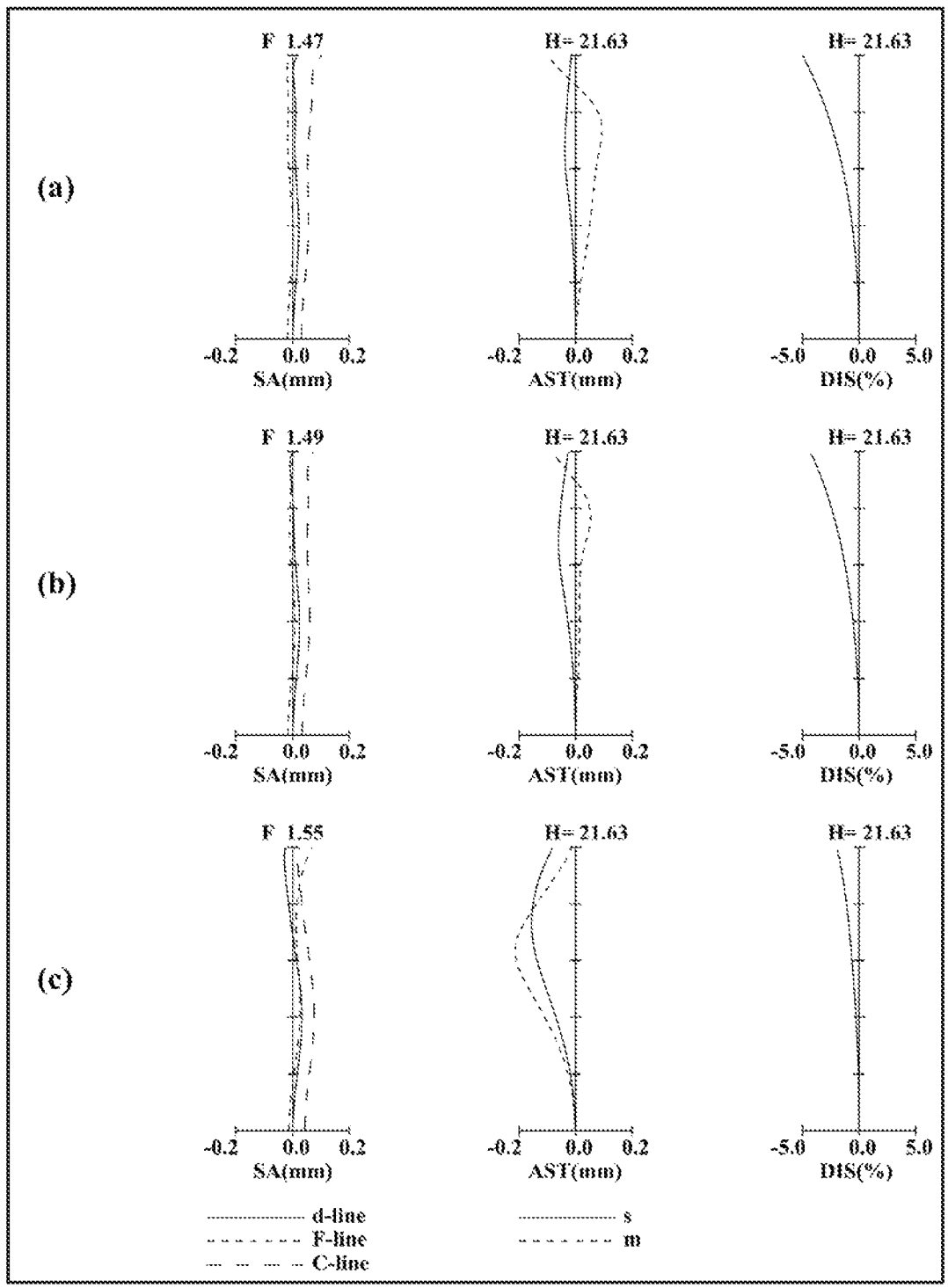
FIG. 8 illustrates longitudinal aberration diagrams showing the infinity in-focus state, the close-object in-focus state, and the middle position in-focus state of the imaging optical system according to the third example of numerical values corresponding to the fourth embodiment.

FIG. 7 illustrates lens arrangement diagrams showing the infinity in-focus state, the close-object in-focus state, and the middle position in-focus state of an imaging optical system according to the fourth embodiment and their operations.

As shown in FIG. 7, the imaging optical system according to this embodiment includes a first lens group G1 having positive power, an aperture stop A, a second lens group G2 having negative power, and a third lens group G3 having positive power, which are arranged in this order such that the first lens group G1 is located closer to an object than any of the aperture stop A, the second lens group G2, or the third lens group G3 and that the third lens group G3 is located closer to the image than any of the first lens group G1, the aperture stop A, or the second lens group G2. The first lens group G1 is an example of the front group. The third lens group G3 is an example of the rear group.

The first lens group G1 includes: a first lens L1 having positive power; a second lens L2 having negative power; a third lens L3 having negative power; a fourth lens L4 having negative power; a fifth lens L5 having positive power; a sixth lens L6 having positive power; a seventh lens L7 having positive power; an eighth lens L8 having negative power; and a ninth lens L9 having positive power, which are arranged in this order such that the first lens L1 is located closer to the object than any other member of the first lens group G1 and that the ninth lens L9 is located closer to the image than any other member of the first lens group G1.

The fourth lens L4 and the fifth lens L5 together form a bonded lens when bonded together with an adhesive such as an ultraviolet-curable resin. The seventh lens L7 and the eighth lens L8 together form a bonded lens when bonded together with an adhesive such as an ultraviolet-curable resin. The ninth lens L9 is an example of the lens LG1R.

The second lens group G2 includes a tenth lens L10 having negative power.

The tenth lens L10 is an example of the single lens Fn.

The third lens group G3 includes: an eleventh lens L11 having positive power; and a twelfth lens L12 having negative power, which are arranged in this order such that the eleventh lens L11 is located closer to the object than the twelfth lens L12 and that the twelfth lens L12 is located closer to the image than the eleventh lens L11. The eleventh lens L11 is an example of the positive lens Lp. The twelfth lens L12 is an example of the lens LGnR.

Next, the respective lenses that form these lens groups of the imaging optical system according to this embodiment will be described.

First, the respective lenses that form the first lens group G1 will be described.

The first lens L1 is a meniscus lens with a convex surface facing the object. The second lens L2 is meniscus lens with a convex surface facing the object. The third lens L3 is a meniscus lens with a convex surface facing the image and both surfaces thereof are aspheric surfaces. The fourth lens L4 is a meniscus lens with a convex surface facing the object. The fifth lens L5 is a biconvex lens. The sixth lens L6 is a biconvex lens. The seventh lens L7 is a biconvex lens. The eighth lens L8 is a biconcave lens. The ninth lens L9 is a biconvex lens.

Next, the lens included in the second lens group G2 will be described.

The tenth lens L10 is a meniscus lens with a convex surface facing the object and both surfaces thereof are aspheric surfaces.

Next, the lenses that form the third lens group G3 will be described.

The eleventh lens L11 is a biconvex lens. The twelfth lens L12 is a biconcave lens and both surfaces thereof are aspheric surfaces.

While the imaging optical system according to this embodiment is focusing to make a transition from the infinity in-focus state to the close-object in-focus state, the first lens group G1 does not move, the aperture stop A does not move, either, the second lens group G2 moves along the optical axis toward the image, and the third lens group G3 does not move.

That is to say, the imaging optical system performs focusing with the intervals between the respective lens groups changed.

(Conditions and Effects)

Next, conditions for implementing the imaging optical systems according to the first to fourth embodiments will be described.

That is to say, a plurality of possible conditions are defined for the imaging optical system according to each of these four embodiments. In that case, an imaging optical system, of which the configuration satisfies all of those possible conditions, is most advantageous.

Alternatively, an imaging optical system that achieves its expected advantages by satisfying the individual conditions to be described below may also be obtained.

An imaging optical system according to each of the first to fourth embodiments includes: a front group having positive power; an aperture stop; a single lens Fn arranged adjacent to the aperture stop and having negative power; and a rear group having power. The front group, the aperture stop, the single lens Fn, and the rear group are arranged in this order such that the front group is located closer to an object than any of the aperture stop, the single lens Fn, or the rear group is and that the rear group is located closer to an image than any of the front group, the aperture stop, or the single lens Fn is. The front group includes: a first lens having positive power; a second lens having negative power; and a lens LG1R having positive power. The first lens, the second lens, and the lens LG1R are arranged in this order such that the first lens is located closest to the object and that the lens LG1R is located closest to the image. The rear group includes a lens LGnR having negative power and located closest to the image. While the imaging optical system is focusing to make a transition from an infinity in-focus state to a close-object in-focus state, neither the front group nor the rear group moves but the single lens Fn moves along an optical axis toward the image. The imaging optical system suitably satisfies the following Inequality (1):

$$0.38<fLG1R/fG1<1.75 \quad (1)$$

where fG1 is a focal length of the front group and fLG1R is a focal length of the lens LG1R.

The condition expressed by this Inequality (1) defines a relation between the focal length of the front group and the focal length of the lens LG1R. If fLG1R/fG1 were equal to or less than the lower limit (=0.38) of the Inequality (1), then it would be difficult to compensate for the spherical aberration and good image forming performance would not be achieved. Conversely, if fLG1R/fG1 were equal to or greater than the upper limit (=1.75) of the Inequality (1), then the lens LG1R would have its light ray converging effect weakened too much to reduce the weight of the focus lens easily.

To enhance the advantage described above, at least one of the conditions expressed by the following Inequalities (1a) and (1b) is suitably satisfied:

$$0.63<fLG1R/fG1 \quad (1a)$$

$$fLG1R/fG1<1.5 \quad (1b)$$

More suitably, to further enhance the advantage described above, at least one of the conditions expressed by the following Inequalities (1c) and (1d) may be satisfied:

$$0.79<fLG1R/fG1 \quad (1c)$$

$$fLG1R/fG1<1.0 \quad (1d)$$

The imaging optical system suitably further includes another single lens Fp having positive power and arranged between the single lens Fn and the rear group such that the single lens Fp is located adjacent to, and closer to the image than, the single lens Fn and is located adjacent to, and closer to the object than, the rear group. While the imaging optical system is focusing to make a transition from the infinity in-focus state to the close-object in-focus state, the single lens Fp suitably moves along the optical axis toward the object.

This allows the aberrations involved with focusing on the single lens Fn, such as field curvature, among other things, to be canceled by the movement of the single lens Fp, thus achieving good image forming performance from an infinity focus point through a close range.

Also, the imaging optical system suitably satisfies, for example, the following Inequality (2):

$$0.02<Lsff/fw<1.1 \quad (2)$$

where Lsff is a length measured along the optical axis from the aperture stop A to a surface, facing the image, of one of the single lenses moving during focusing which is located closer to the image than the other single lens is, and fw is a focal length of the entire imaging optical system.

The condition expressed by this Inequality (2) defines a relation between the length measured along the optical axis from the aperture stop A to a surface, facing the image, of one of the single lenses moving during focusing which is located closer to the image than the other single lens is and the focal length of the entire imaging optical system. If Lsff/fw is equal to or less than the lower limit (=0.02) of the Inequality (2), then a focus lens holding frame would be too close to a diaphragm unit, thus making it difficult to form a lens barrel. Conversely, if Lsff/fw is equal to or greater than the upper limit (=1.1) of the Inequality (2), then an off-axis light ray passing through the focus lens would have a significantly increased height, thus causing an increase in the size of the focus lens. In addition, the performance would vary too significantly through focusing to ensure good performance from the infinity focus point through the close range.

To enhance the advantage described above, at least one of the conditions expressed by the following Inequalities (2a) and (2b) is suitably satisfied:

$$0.04 < Lsff/fw \quad (2a)$$

$$Lsff/fw < 0.83 \quad (2b)$$

More suitably, to further enhance the advantage described above, at least one of the conditions expressed by the following Inequalities (2c) and (2d) may be satisfied:

$$0.046 < Lsff/fw \quad (2c)$$

$$Lsff/fw < 0.066 \quad (2d)$$

Also, the imaging optical system suitably satisfies the following Inequality (3):

$$0.029 < Lg1mf/fw < 0.1 \quad (3)$$

where Lg1mf is a length measured along the optical axis from a rear surface of the lens LG1R to a surface, facing the object, of one of the single lenses moving during focusing which is located closer to the image than the other single lens is.

If Lg1mf/fw were equal to or less than the lower limit (=0.029) of the Inequality (3), then the lens LG1R would not achieve a light ray converging effect significantly enough to reduce the aperture of the focus lens easily, thus making it difficult to reduce the weight of the focus lens. Conversely, if Lg1mf/fw were equal to or greater than the upper limit (=0.1) of the Inequality (3), then the absolute value of the zoom power of the focus lens would become so small as to cause a decrease in focus adjustment sensitivity and make focusing difficult.

To enhance the advantage described above, at least one of the conditions expressed by the following Inequalities (3a) and (3b) is suitably satisfied:

$$0.039 < Lg1mf/fw < 0.1 \quad (3a)$$

$$Lg1mf/fw < 0.061 \quad (3b)$$

More suitably, to further enhance the advantage described above, at least one of the conditions expressed by the following Inequalities (3c) and (3d) may be satisfied:

$$0.046 < Lg1mf/fw \quad (3c)$$

$$Lg1mf/fw < 0.056 \quad (3d)$$

Also, the imaging optical system suitably satisfies the following Inequality (4):

$$-2.0 < fFn/fw < -0.5 \quad (4)$$

where fFn is a focal length of the single lens Fn and fw is a focal length of the entire imaging optical system.

If fFn/fw were equal to or less than the lower limit (=−2.0) of the Inequality (4), then the absolute value of the zoom power of the focus lens group would become too small, and therefore, the sensitivity of image plane movement caused by the movement of the focus lens group would also become too low, to have focusing done easily. Conversely, if fFn/fw were equal to or greater than the upper limit (=−0.5) of the Inequality (4), then the variation in aberration caused by focus shifting (e.g., the variation in field curvature, among other things) would be too significant to maintain good resolution performance from an infinity focus point through a close range easily.

To enhance the advantage described above, at least one of the conditions expressed by the following Inequalities (4a) and (4b) is suitably satisfied:

$$-1.8 < fFn/fw \quad (4a)$$

$$fFn/fw < -0.8 \quad (4b)$$

More suitably, to further enhance the advantage described above, at least one of the conditions expressed by the following Inequalities (4c) and (4d) may be satisfied:

$$-1.7 < fFn/fw \quad (4c)$$

$$fFn/fw < -1.3 \quad (4d)$$

Furthermore, in the imaging optical system, the front group suitably includes at least one aspheric lens satisfying the following Inequality (5):

$$0.6 < |fLG1a/fG1| < 6.0 \quad (5)$$

where fLG1a is a focal length of the aspheric lens and fG1 is a focal length of the front group.

If |fLG1a/fG1| were less than the lower limit (=0.6) of the Inequality (5), then the aberration produced from spherical components would become so excessive as to make it difficult to selectively compensate for high-order aberration using aspheric components. This makes it difficult to compensate for aberrations (in particular, selectively compensate for high-order spherical aberrations), thus making it difficult to maintain good image forming performance and good image quality during out-focusing. Conversely, if |fLG1a/fG1| were greater than the upper limit (=6.0) of the Inequality (5), then the power of the aspheric lens would be too weak to avoid an increase in total optical length.

To enhance the advantage described above, at least one of the conditions expressed by the following Inequalities (5a) and (5b) is suitably satisfied:

$$1.1 < |fLG1a/fG1| \quad (5a)$$

$$|fLG1a/fG1| < 5.5 \quad (5b)$$

More suitably, to further enhance the advantage described above, at least one of the conditions expressed by the following Inequalities (5c) and (5d) may be satisfied:

$$1.7 < |fLG1a/fG1| \quad (5c)$$

$$|fLG1a/fG1| < 2.2 \quad (5d)$$

Furthermore, in the imaging optical system, the front group suitably includes, between the second lens L2 and the lens LG1R, at least one lens LG1ed having positive power and satisfying the following Inequality (6):

$$0.015 < LG1ed\_dPgf \quad (6)$$

where LG1ed_dPgf is anomalous dispersion of the lens LG1ed.

If LG1ed_dPgf were equal to or less than the lower limit (=0.015) of the Inequality (6), then it would be difficult to compensate for axial chromatic aberrations, among other things.

Furthermore, the imaging optical system suitably satisfies the following Inequality (7):

$$2.7 < Fno/fw \times L < 6.0 \quad (7)$$

where Fno is an F number (maximum aperture) of the lens system, fw is a focal length of the entire imaging optical system, and L is a total optical length from a surface, facing the object, of the first lens in the imaging optical system to an image plane.

If Fno/fw×L were equal to or less than the lower limit (=2.7) of the Inequality (7), then the power of each lens would increase too much to compensate for the spherical aberration easily. Conversely, if Fno/fw×L were equal to or greater than the upper limit (=6.0) of the Inequality (7), then the total optical length would be too long to reduce the overall size easily. In addition, the lens aperture would increase too much to compensate for spherical aberrations easily.

To enhance the advantage described above, at least one of the conditions expressed by the following Inequalities (7a) and (7b) is suitably satisfied:

$$3.4 < Fno/fw \times L \quad (7a)$$

$$Fno/fw \times L < 5.2 \quad (7b)$$

More suitably, to further enhance the advantage described above, at least one of the conditions expressed by the following Inequalities (7c) and (7d) may be satisfied:

$$4.3 < Fno/fw \times L \quad (7c)$$

$$Fno/fw \times L < 4.6 \quad (7d)$$

Furthermore, the imaging optical system includes at least one positive lens Lp arranged closer to the image than the single lens Fn is and satisfying the following Inequality (8):

$$Lp\_\upsilon d < 35 \quad (8)$$

where Lp_υd is an abbe number with respect to a d line of the positive lens Lp.

If Lp_υd were greater than the upper limit (=35) of the Inequality (8), then it would be difficult to compensate for various types of aberrations (e.g., chromatic aberration of magnification, among other things).

To enhance the advantage described above, the condition expressed by the following Inequality (8a) is suitably satisfied:

$$Lp\_\upsilon d < 25 \quad (8a)$$

More suitably, to further enhance the advantage described above, the condition expressed by the following Inequality (8b) may be satisfied:

$$Lp\_\upsilon d < 20 \quad (8b)$$

These advantages are achieved significantly in a large-aperture imaging optical system with an F number of 2 or less, among other things, and achieved even more significantly particularly when the F number is equal to or less than 1.6.

(Schematic Configuration for Image Capture Device to which First Embodiment is Applied)

Figure 9:
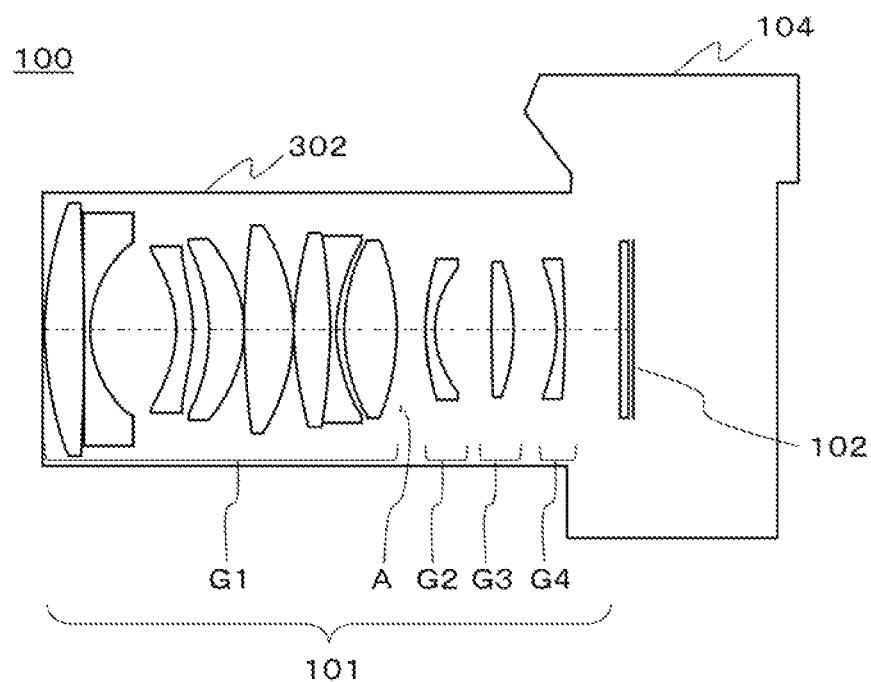
FIG. 9 illustrates a schematic configuration for a digital camera according to the first embodiment.

FIG. 9 illustrates a schematic configuration for an image capture device, to which the imaging optical system of the first embodiment is applied. Optionally, the imaging optical system according to the second, third, or fourth embodiment is also applicable to the image capture device.

The image capture device 100 includes a housing 104, an image sensor 102, and the imaging optical system 101 according to the first embodiment. Specifically, the image capture device 100 may be implemented as a digital camera, for example.

The lens barrel 302 holds the respective lens groups and the aperture stop A that form the imaging optical system 101.

The image sensor 102 is arranged at the image plane S of the imaging optical system according to the first embodiment.

In addition, an actuator, a lens frame, and other members housed in the housing 104 are arranged with respect to the imaging optical system 101 such that the second lens group G2 and the third lens group G3 move while the imaging optical system 101 is focusing.

This provides an image capture device in which various types of aberrations have been compensated for sufficiently.

In the example described above, the imaging optical system according to the first embodiment is applied to a digital camera. However, this is only an example and should not be construed as limiting. Alternatively, the imaging optical system is also applicable to a surveillance camera, a smartphone and various other types of image capture devices.

(Schematic Configuration for Camera System to which First Embodiment is Applied)

Figure 10:
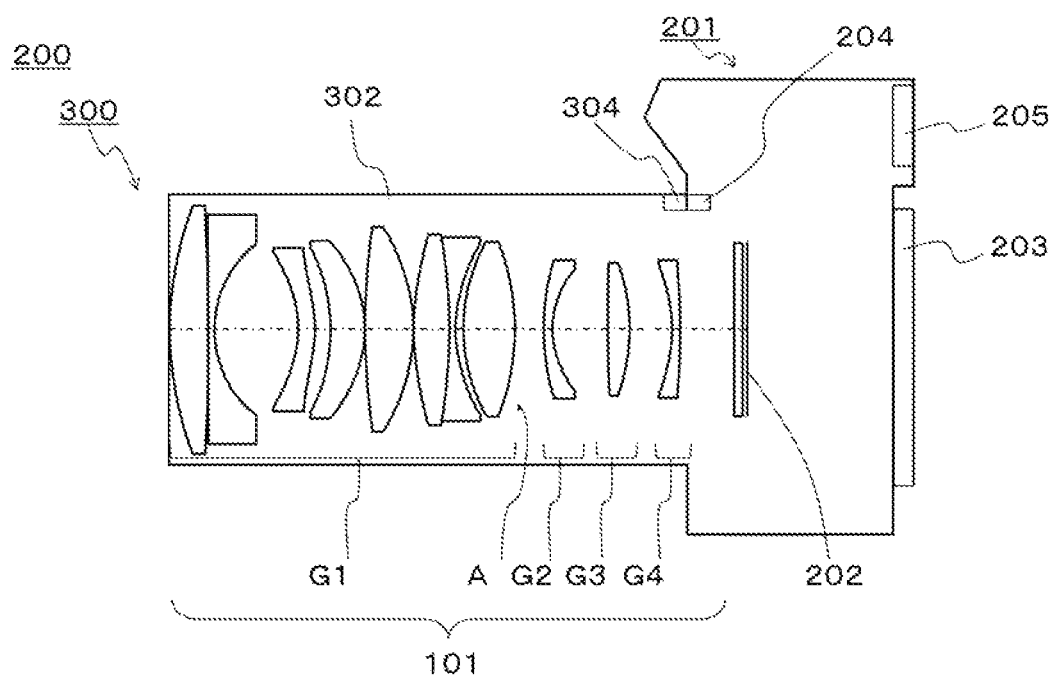
FIG. 10 illustrates a schematic configuration for a lens-interchangeable digital camera according to the first embodiment.

FIG. 10 illustrates a schematic configuration for a camera system, to which the imaging optical system of the first embodiment is applied. Optionally, the imaging optical system according to the second, third, or fourth embodiment is also applicable to the camera system.

The camera system 200 includes a camera body 201 and an interchangeable lens unit 300 to be connected removably to the camera body 201.

The camera body 201 includes an image sensor 202, a monitor 203, a memory (not shown), a camera mount 204, and a viewfinder 205. The image sensor 202 receives an optical image formed by the imaging optical system of the interchangeable lens unit 300 and transforms the optical image into an electrical image signal. The monitor 203 displays the image signal transformed by the image sensor 202. The memory stores the image signal.

The interchangeable lens unit 300 includes the imaging optical system according to the first embodiment.

The lens barrel 302 holds the respective lens groups and aperture stop A of the imaging optical system 101. The lens barrel 302 further includes a lens mount 304 to be connected to the camera mount 204 of the camera body 201.

The camera mount 204 and the lens mount 304 not only are physically connected together but also electrically connect together a controller (not shown) in the camera body 201 and a controller (not shown) in the interchangeable lens unit 300. That is to say, the camera mount 204 and the lens mount 304 serve as interfaces that allow the camera mount 204 and the lens mount 304 to exchange signals with each other.

The imaging optical system 101 includes at least the respective lens groups held by the lens barrel 302 and the camera body 201. In addition, the imaging optical system 101 further includes an actuator, a lens frame, and other members to be controlled by the controller in the interchangeable lens unit 300 such that the second lens group G2 and the third lens group G3 move while the imaging optical system 301 is focusing.

Other Embodiments

The first, second, third, and fourth embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

Furthermore, in the first to fourth embodiments described above, each of the lens groups that form the imaging optical system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction and/or refractive-diffractive hybrid lenses that deflect the incoming light ray through a combination of diffraction and refraction actions. Still alternatively, each lens group may also be made up of refractive index distributed lenses that deflect the incoming light ray in accordance with the distribution of refractive indices in the medium. Among other things, a diffraction structure is suitably formed at the interface between two media with mutually different refractive indices in the diffractive-refractive hybrid lens, because the diffraction efficiency would depend on the wavelength much less heavily in that case. This provides a camera system in which various types of aberrations have been compensated for sufficiently.

In the first to fourth embodiments, a single-focus lens system has been described as an exemplary imaging optical system. However, the imaging optical system may be any other type of optical system as long as an optical image formed by the imaging optical system may be formed on an image sensor for receiving the optical image and transforming the optical image into an electrical image signal. Therefore, the imaging optical system does not have to be a single-focus optical system. Alternatively, some or all of the lenses or lens groups, each being made up of a plurality of lenses, which form the imaging optical system may be moved while the imaging optical system is zooming from a wide-angle end toward a telephoto end.

Optionally, in the first to third embodiments, the image quality during out-focusing may be controlled by controlling the magnitude of spherical aberration without changing back focusing through appropriate adjustment of the magnitude of focus lens movement of the single lens Fn and the single lens Pn.

Examples of Numerical Values

Next, exemplary sets of specific numerical values that were actually adopted in the imaging optical systems with the configurations according to the first, second, third, and fourth embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index with respect to a d-line, υd (also denoted as "vd") indicates an abbe number with respect to a d-line, and dPgF indicates anomalous dispersion of a g line and an F line. Furthermore, in the following examples of numerical values, a surface with an asterisk (*) is an aspheric surface. The aspheric shape is defined by the following Equation (1):

$$Z = \frac{h^2/r}{1 + \sqrt{1 - (1+\kappa)(h/r)^2}} + \sum A_n h^n \quad \text{[Mathematical Expression 1]}$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 2, 4, 6, and 8 are longitudinal aberration diagrams showing the infinity in-focus state, the close-object in-focus state, and the middle position in-focus state of the imaging optical systems according to the first, second, third, and fourth embodiments, respectively.

In each of FIGS. 2, 4, 6, and 8, portion (a) shows the longitudinal aberrations in the infinity in-focus state, portion (b) shows the longitudinal aberrations in the middle-position in-focus state, and portion (c) shows the longitudinal aberrations in the close-object in-focus state.

Each of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the imaging optical system corresponding to the first embodiment shown in FIG. 1. Specifically, as the first example of numerical values for the imaging optical system, surface data is shown in Table 1A, aspheric surface data is shown in Table 1B, various types of data in the infinity in-focus state, the middle-position in-focus state, and the close-object in-focus state are shown in Table 1C, and single lens data is shown in Table 1D.

TABLE 1A

| Surface data | | | | | |
|---|---|---|---|---|---|
| Surface No. | r | d | nd | vd | dPgF |
| Object surface | ∞ | Variable | | | |
| 1 | 85.24530 | 9.73870 | 1.92286 | 20.9 | 0.0282 |

TABLE 1A-continued

Surface data

| Surface No. | r | d | nd | vd | dPgF |
|---|---|---|---|---|---|
| 2 | −542.64600 | 0.20000 | | | |
| 3 | −1123.81230 | 1.50000 | 1.51680 | 64.2 | |
| 4 | 27.40460 | 20.97930 | | | |
| 5* | −26.27500 | 4.20000 | 1.80998 | 40.9 | |
| 6* | −34.68100 | 3.96420 | | | |
| 7 | −44.68930 | 8.51470 | 1.49700 | 81.6 | 0.0375 |
| 8 | −33.04770 | 0.20000 | | | |
| 9 | 183.55220 | 1.202720 | 1.59282 | 68.6 | 0.0194 |
| 10 | −47.11710 | 0.20000 | | | |
| 11 | 80.91750 | 8.92840 | 1.80420 | 46.5 | |
| 12 | −130.56610 | 1.50000 | 2.05090 | 26.9 | |
| 13 | 39.47510 | 2.00740 | | | |
| 14 | 44.45970 | 13.02980 | 1.72916 | 54.7 | |
| 15 | −58.09230 | 1.00000 | | | |
| 16 (aperture) | ∞ | Variable | | | |
| 17* | 58.20670 | 2.26310 | 1.68948 | 31.0 | |
| 18* | 24.19210 | Variable | | | |
| 19 | 680.75690 | 5.35000 | 1.94595 | 18.0 | 0.0386 |
| 20 | −50.71870 | Variable | | | |
| 21* | −35.11240 | 2.00000 | 1.68948 | 31.0 | |
| 22* | −214.69990 | 13.60000 | | | |
| 23 | ∞ | 2.10000 | 1.51680 | 64.2 | |
| 24 | ∞ | BF | | | |
| Image plane | ∞ | | | | |

TABLE 1B

Aspheric surface data $5^{th}$ surface

K = 0.00000E+00, A4 = 1.44712E−05, A6 = 3.68006E−08,
A8 = −4.27668E−10, A10 = 1.32464E−13

$6^{th}$ surface

K = 0.00000E−00, A4 = 1.86289E−05, A6 = 3.06573E−08,
A8 = −8.63542E−11, A10 = 7.01394E−14

$17^{th}$ surface

K = 0.00000E+00, A4 = 4.72563E−06, A6 = −2.20286E−08,
A8 = 4.33723E−11, A10 = −3.23551E−14

$18^{th}$ surface

K = 0.00000E−00, A4 = 5.57353E−06, A6 = −2.51083E−08,
A8 = 4.01273E−11, A10 = −3.22271E−14

$21^{st}$ surface

K = 0.00000E+00, A4 = 9.01876E−06, A6 = 1.26236E−08,
A8 = −4.01882E−11, A10 = 1.30783E−14

$22^{nd}$ surface

K = 0.00000E+00, A4 = −6.87644E−08, A6 = 1.41500E−09,
A8 = 0.00000E+00, A10 = 0.00000E+00

(Various Types of Data in Infinity In-Focus State, Middle Position In-Focus State, and Close-Object In-Focus State)

TABLE 1C (Various types of data)

| | Infinity | −0.35× | −0.15× (close object) |
|---|---|---|---|
| Focal length | 49.0004 | 47.8581 | 44.2577 |
| F number | 1.47031 | 1.48529 | 1.53402 |
| Angle of view | 25.5276 | 25.0778 | 23.6157 |
| Image height | 21.6300 | 21.6300 | 21.6300 |
| Total lens length | 145.0000 | 145.0012 | 145.0023 |
| BF | 1.00014 | 1.00070 | 1.00088 |

TABLE 1C-continued (Various types of data)

| | Infinity | −0.35× | −0.15× (close object) |
|---|---|---|---|
| d0 | ∞ | 1355.0000 | 291.3811 |
| d16 | 1.5000 | 2.4906 | 5.9610 |
| d18 | 19.2683 | 18.0594 | 13.9548 |
| d20 | 9.9288 | 10.1477 | 10.7828 |
| Entrance pupil position | 53.7399 | 53.7399 | 53.7399 |
| Exit pupil position | −46.1234 | −45.8347 | −44.7561 |
| Anterior principal point | 51.7883 | 50.8680 | 47.9251 |
| Posterior principal point | 95.9996 | 95.4565 | 94.1058 |

TABLE 1D (Data about single lens)

| Lens | Start surface | Focal length |
|---|---|---|
| 1 | 1 | 80.4288 |
| 2 | 3 | −51.7424 |
| 3 | 5 | −172.3782 |
| 4 | 7 | 205.3851 |
| 5 | 9 | 64.4961 |
| 6 | 11 | 63.3117 |
| 7 | 12 | −28.7131 |
| 8 | 14 | 36.4950 |
| 9 | 17 | −61.7184 |
| 10 | 19 | 50.0773 |
| 11 | 21 | −61.1608 |

Second Example of Numerical Values

Following is a second exemplary set of numerical values for the imaging optical system corresponding to the second embodiment shown in FIG. 3. Specifically, as the second example of numerical values for the imaging optical system, surface data is shown in Table 2A, aspheric surface data is shown in Table 2B, various types of data in the infinity in-focus state, the middle-position in-focus state, and the close-object in-focus state are shown in Table 2C, and single lens data is shown in Table 2D.

TABLE 2A (Surface data)

| Surface No. | r | d | nd | vd | dPgF |
|---|---|---|---|---|---|
| Object surface | ∞ | Variable | | | |
| 1 | 74.85820 | 8.19570 | 1.92286 | 20.9 | 0.0282 |
| 2 | 3077.26230 | 1.25360 | | | |
| 3 | 483.06550 | 1.50000 | 1.51680 | 64.2 | |
| 4 | 27.31690 | 16.80910 | | | |
| 5* | −29.41500 | 4.15000 | 1.80755 | 40.9 | |
| 6* | −43.00520 | 5.39250 | | | |
| 7 | −39.21720 | 7.00000 | 1.72916 | 54.7 | |
| 8 | −36.09520 | 1.54930 | | | |
| 9 | 107.07870 | 10.85730 | 1.59282 | 68.6 | 0.0194 |
| 10 | −56.53950 | 0.30000 | | | |
| 11 | 76.95830 | 9.58660 | 1.59282 | 68.6 | 0.0194 |
| 12 | −66.32730 | 1.51000 | 1.85478 | 24.8 | |
| 13 | 40.54460 | 3.73820 | | | |
| 14 | 49.77850 | 10.03520 | 1.83481 | 42.7 | |
| 15 | −76.52000 | 1.00000 | | | |
| 16 (aperture) | ∞ | Variable | | | |
| 17 | 65.4880 | 1.40000 | 1.80610 | 33.3 | |
| 18 | 28.33510 | Variable | | | |
| 19 | 203.74010 | 5.00780 | 1.94595 | 18.0 | 0.0386 |

TABLE 2A-continued (Surface data)

| Surface No. | r | d | nd | vd | dPgF |
|---|---|---|---|---|---|
| 20 | −67.16290 | Variable | | | |
| 21 | −329.70410 | 1.51000 | 1.56732 | 42.8 | |
| 22 | 49.70350 | 8.93930 | 1.55032 | 75.5 | 0.0277 |
| 23 | −58.24610 | 6.25680 | | | |
| 24* | −29.13770 | 2.00000 | 1.68822 | 31.1 | |
| 25* | −215.58860 | 13.42000 | | | |
| 26 | ∞ | 2.10000 | 1.51680 | 64.2 | |
| 27 | ∞ | BF | | | |
| Image plane | ∞ | | | | |

TABLE 2B (Aspheric surface data)

$5^{th}$ surface

K = 0.00000E+00, A4 = 1.63582E−05, A6 = 4.90963E−09,
A8 = −4.42369E−11, A10 = 5.16463E−14

$6^{th}$ surface

K = 0.00000E+00, A4 = 1.77232E−05, A6 = 5.86926E−09,
A8 = −3.44143E−11, A10 = 3.24554E−14

$24^{th}$ surface

K = 0.00000E+00, A4 = 1.43195E−05, A6 = 1.87688E−08,
A8 = −6.26576E−11, A10 = 8.75135E−14

$25^{th}$ surface

K = 0.00000E+00, A4 = 1.82970E−06, A6 = 1.40500E−08,
A8 = −4.86998E−11, A10 = 5.83021E−14

(Various Types of Data in Infinity In-Focus State, Middle Position In-Focus State, and Close-Object In-Focus State)

TABLE 2C (Various types of data)

| | INF | −0.03533x | −0.15000x (close object) |
|---|---|---|---|
| Focal length | 49.0013 | 48.0631 | 45.0299 |
| F number | 1.47047 | 1.49087 | 1.55908 |
| Angle of view | 25.7988 | 25.2949 | 23.6694 |
| Image height | 21.6300 | 21.6300 | 21.6300 |
| Total lens length | 148.0044 | 148.0044 | 148.0062 |
| BF | 1.00429 | 1.00427 | 1.00407 |
| d0 | ∞ | 1355.0000 | 295.4248 |
| d16 | 1.5000 | 2.5388 | 6.1878 |
| d18 | 19.9887 | 18.6081 | 13.9936 |
| d20 | 2.0000 | 2.3418 | 3.3093 |
| Entrance pupil position | 53.6882 | 53.6882 | 53.6882 |
| Exit pupil position | −48.8173 | −48.4578 | −47.1973 |
| Anterior principal point | 54.4950 | 53.3871 | 49.7953 |
| Posterior principal point | 99.0031 | 98.2431 | 96.2216 |

TABLE 2D (Data about single lens)

| Lens | Start surface | Focal length |
|---|---|---|
| 1 | 1 | 83.0291 |
| 2 | 3 | −56.0891 |
| 3 | 5 | −133.4737 |
| 4 | 7 | 319.6268 |
| 5 | 9 | 63.9968 |
| 6 | 11 | 61.6270 |

TABLE 2D-continued (Data about single lens)

| Lens | Start surface | Focal length |
|---|---|---|
| 7 | 12 | −29.2475 |
| 8 | 14 | 37.4821 |
| 9 | 17 | −63.0413 |
| 10 | 19 | 53.8823 |
| 11 | 21 | −76.0242 |
| 12 | 22 | 50.2080 |
| 13 | 24 | −49.1691 |

Third Example of Numerical Values

Following is a third exemplary set of numerical values for the imaging optical system corresponding to the third embodiment shown in FIG. 5. Specifically, as the third example of numerical values for the imaging optical system, surface data is shown in Table 3A, aspheric surface data is shown in Table 3B, various types of data in the infinity in-focus state, the middle-position in-focus state, and the close-object in-focus state are shown in Table 3C, and single lens data is shown in Table 3D.

TABLE 3A (Surface data)

| Surface No. | r | d | nd | vd | dPgF |
|---|---|---|---|---|---|
| Object surface | ∞ | Variable | | | |
| 1 | 66.06050 | 9.22360 | 1.92286 | 20.9 | 0.0282 |
| 2 | 485.59910 | 3.52250 | | | |
| 3 | −5608.83060 | 1.50000 | 1.51680 | 64.2 | |
| 4 | 24.46390 | 16.10840 | | | |
| 5 | −42.31610 | 1.50000 | 1.58144 | 40.9 | |
| 6 | 200.32300 | 3.62650 | | | |
| 7* | 249.44970 | 9.00000 | 1.80755 | 40.9 | |
| 8* | −75.21600 | 0.20000 | | | |
| 9 | 81.98150 | 10.71540 | 1.59282 | 68.6 | 0.0194 |
| 10 | −53.43840 | 0.30000 | | | |
| 11 | 114.34700 | 7.73320 | 1.59282 | 68.6 | 0.0194 |
| 12 | −52.05410 | 1.51000 | 1.85478 | 24.8 | |
| 13 | 41.41260 | 6.68530 | | | |
| 14 | 65.48720 | 10.06350 | 1.80420 | 46.5 | |
| 15 | −53.81850 | 1.00000 | | | |
| 16 (aperture) | ∞ | Variable | | | |
| 17 | 64.14180 | 1.40000 | 1.71736 | 29.5 | |
| 18 | 29.20250 | Variable | | | |
| 19 | 147.42070 | 5.10000 | 1.94595 | 18.0 | 0.0386 |
| 20 | −72.65390 | Variable | | | |
| 21 | −154.23060 | 1.51000 | 1.56732 | 42.8 | |
| 22 | 45.80270 | 9.05540 | 1.55032 | 75.5 | 0.0277 |
| 23 | −55.28670 | 6.53900 | | | |
| 24* | −30.72590 | 2.00000 | 1.68822 | 31.1 | |
| 25* | −215.58860 | 13.42000 | | | |
| 26 | ∞ | 2.10000 | 1.51680 | 64.2 | |
| 27 | ∞ | BF | | | |
| Image plane | ∞ | | | | |

TABLE 3B (Aspheric surface data)

$7^{th}$ surface

K = 0.00000E+00, A4 = 4.04714E−07, A6 = 2.58016E−09,
A8 = 4.51006E−12, A10 = −1.10997E−14

$8^{th}$ surface

K = 0.00000E+00, A4 = 3.87260E−06, A6 = 1.87609E−09,
A8 = 7.45815E−12, A10 = −1.12514E−14

$24^{th}$ surface

K = 0.00000E+00, A4 = 1.32764E−05, A6 = 9.38299E−09,
A8 = −5.00850E−11, A10 = 7.82519E−14

$25^{th}$ surface

K = 0.00000E+00, A4 = 3.61044E−06, A6 = 5.93299E−09,
A8 = −4.07704E−11, A10 = 5.45033E−14

(Various Types of Data in Infinity In-Focus State, Middle Position In-Focus State, and Close-Object In-Focus State)

TABLE 3C (Various types of data)

|  | INF | −0.03523× | −0.15000× (close object) |
|---|---|---|---|
| Focal length | 49.0004 | 48.1279 | 45.2315 |
| F number | 1.47045 | 1.49207 | 1.56494 |
| Angle of view | 25.6892 | 25.1505 | 23.4000 |
| Image height | 21.6300 | 21.6300 | 21.6300 |
| Total lens length | 148.0040 | 148.0039 | 148.0055 |
| BF | 1.00419 | 1.00421 | 1.00398 |
| d0 | ∞ | 1355.0000 | 291.4803 |
| d16 | 1.5000 | 2.8321 | 7.5963 |
| d18 | 19.6870 | 18.0208 | 12.3145 |
| d20 | 2.0000 | 2.3340 | 3.2779 |
| Entrance pupil position | 59.0757 | 59.0757 | 59.0757 |
| Exit pupil position | −49.3285 | −48.9491 | −47.5201 |
| Anterior principal point | 60.3727 | 59.2052 | 55.2913 |
| Posterior principal point | 99.0036 | 98.1804 | 95.9892 |

TABLE 3D (Data about single lens)

| Lens | Start surface | Focal length |
|---|---|---|
| 1 | 1 | 81.9886 |
| 2 | 3 | −47.1276 |
| 3 | 5 | −59.9494 |
| 4 | 7 | 72.4602 |
| 5 | 9 | 56.2268 |
| 6 | 11 | 61.4010 |
| 7 | 12 | −26.7827 |
| 8 | 14 | 38.1687 |
| 9 | 17 | −76.0047 |
| 10 | 19 | 52.0357 |
| 11 | 21 | −62.0792 |
| 12 | 22 | 47.0135 |
| 13 | 24 | −52.2966 |

Fourth Example of Numerical Values

Following is a fourth exemplary set of numerical values for the imaging optical system corresponding to the fourth embodiment shown in FIG. 7. Specifically, as the fourth example of numerical values for the imaging optical system, surface data is shown in Table 4A, aspheric surface data is shown in Table 4B, various types of data in the infinity in-focus state, the middle-position in-focus state, and the close-object in-focus state are shown in Table 4C, and single lens data is shown in Table 4D.

TABLE 4A (Surface data)

| Surface No. | r | d | nd | vd | dPgF |
|---|---|---|---|---|---|
| Object surface | ∞ | Variable | | | |
| 1 | 73.47370 | 8.46310 | 1.94595 | 18.0 | 0.0386 |
| 2 | 358.71170 | 0.20000 | | | |
| 3 | 197.77560 | 1.50000 | 1.48749 | 70.4 | |
| 4 | 26.33210 | 25.41840 | | | |
| 5* | −27.85560 | 3.98660 | 1.80998 | 40.9 | |
| 6* | −45.27860 | 0.20000 | | | |
| 7 | 142.50030 | 1.50000 | 1.80610 | 33.3 | |
| 8 | 46.11490 | 13.89700 | 1.49700 | 81.6 | 0.0375 |
| 9 | −51.18110 | 0.20000 | | | |
| 10 | 106.37920 | 11.68610 | 1.80420 | 46.5 | |
| 11 | −61.12090 | 0.20000 | | | |
| 12 | 459.03070 | 8.03010 | 1.80420 | 46.5 | |
| 13 | −58.37700 | 1.00000 | 1.72825 | 28.3 | |
| 14 | 35.79480 | 1.44130 | | | |
| 15 | 44.50540 | 9.60600 | 1.72916 | 54.7 | |
| 16 | −95.33910 | 1.00000 | | | |
| 17 (aperture) | ∞ | Variable | | | |
| 18* | 59.43430 | 2.07710 | 1.68948 | 31.0 | |
| 19* | 22.25110 | Variable | | | |
| 20 | 1728.20520 | 5.15230 | 1.94595 | 18.0 | 0.0386 |
| 21 | −47.90030 | 9.34320 | | | |
| 22* | −33.71630 | 2.00000 | 1.80998 | 40.9 | |
| 23* | −81.79960 | 15.24000 | | | |
| 24 | ∞ | 1.41000 | 1.51680 | 64.2 | |
| 25 | ∞ | BF | | | |
| Image plane | ∞ | | | | |

TABLE 4B (Aspheric surface data)

$5^{th}$ surface

K = 0.00000E+00, A4 = 2.11365E−05, A6 = −1.07669E−08,
A8 = −1.28093E−11, A10 = 2.06627E−14

$6^{th}$ surface

K = 0.00000E+00, A4 = 2.14007E−05, A6 = −8.32835E−09,
A8 = −1.37409E−11, A10 = 1.42535E−14

$18^{th}$ surface

K = 0.00000E+00, A4 = −6.10967E−06, A6 = 1.04431E−08,
A8 = −2.68757E−11, A10 = 2.51332E−14

$19^{th}$ surface

K = 0.00000E+00, A4 = −6.72047E−06, A6 = 3.20264E−09,
A8 = −2.33140E−11, A10 = −6.19077E−14

$22^{nd}$ surface

K = 0.00000E+00, A4 = 1.72156E−05, A6 = 4.25337E−09,
A8 = −7.21220E−12, A10 = 4.76474E−15

$23^{rd}$ surface

K = 0.00000E+00, A4 = 8.65688E−06, A6 = −3.14887E−09,
A8 = 0.00000E+00, A10 = 0.00000E+00

(Various Types of Data in Infinity In-Focus State, Middle Position In-Focus State, and Close-Object In-Focus State)

TABLE 4C (Various types of data)

|  | INF | −0.03661× | −0.14840× (close object) |
|---|---|---|---|
| Focal length | 51.0000 | 49.9734 | 46.7777 |
| F number | 1.47033 | 1.48989 | 1.54665 |
| Angle of view | 24.0651 | 23.5463 | 22.0566 |
| Image height | 21.6300 | 21.6300 | 21.6300 |
| Total lens length | 144.9989 | 145.0010 | 145.0017 |
| BF | 0.99888 | 0.99929 | 1.00028 |
| d0 | ∞ | 1360.0000 | 310.0000 |
| d17 | 1.5000 | 2.5667 | 5.9877 |
| d19 | 18.9488 | 17.8838 | 14.4625 |
| Entrance pupil position | 56.6422 | 56.6422 | 56.6422 |
| Exit pupil position | −49.4921 | −49.3165 | −48.4887 |
| Anterior principal point | 56.1281 | 55.1096 | 51.9910 |
| Posterior principal point | 93.9989 | 93.1982 | 91.2822 |

TABLE 4D (Data about single lens)

| Lens | Start surface | Focal length |
|---|---|---|
| 1 | 1 | 96.2909 |
| 2 | 3 | −62.4912 |
| 3 | 5 | −99.5689 |
| 4 | 7 | −85.1695 |
| 5 | 8 | 51.2390 |
| 6 | 10 | 49.8182 |
| 7 | 12 | 64.8487 |
| 8 | 13 | −30.3334 |
| 9 | 15 | 42.8530 |
| 10 | 18 | −52.7880 |
| 11 | 20 | 49.3414 |
| 12 | 22 | −72.1578 |

(Values Corresponding to Inequalities)

Values, corresponding to the Inequalities (1) to (8), of the respective examples of numerical values are shown in the following Table 1:

TABLE 1

| Inequality | 1st example of numerical values | 2nd example of numerical values | 3rd example of numerical values | 4th example of numerical values |
|---|---|---|---|---|
| (1) | 1.044 | 0.958 | 0.876 | 1.246 |
| (2) | 0.579 | 0.569 | 0.565 | 0.070 |
| (3) | 0.051 | 0.051 | 0.051 | 0.049 |
| (4) | −1.260 | −1.287 | −1.551 | −1.035 |
| (5) | 4.933 | 3.412 | 1.663 | 2.896 |
| (6) | L4  0.038 L5  0.019 | L5  0.019 L6  0.019 | L5  0.019 L6  0.019 | L5  0.038 |
| (7) | 4.321 | 4.441 | 4.441 | 4.180 |
| (8) | 18 | 18 | 18 | 18 |

As can be seen from the foregoing description, the present disclosure provides an imaging optical system having a large aperture and yet having not only the ability to form a sharp image from an infinity through a shortest shooting range but also high-speed autofocus capability and also provides an image capture device and camera system using such an imaging optical system.

INDUSTRIAL APPLICABILITY

The imaging optical system according to the present disclosure is applicable to various types of cameras including digital still cameras, lens-interchangeable digital cameras, digital camcorders, cameras for cellphones and smartphones, and cameras for personal digital assistants (PDAs), surveillance cameras for surveillance systems, Web cameras, onboard cameras, and industrial cameras. Among other things, the present disclosure is particularly suitably applicable as an imaging optical system for digital still camera systems, digital camcorder systems, and other camera systems that require high image quality.

REFERENCE SIGNS LIST

G1 First Lens Group
G2 Second Lens Group
G3 Third Lens Group
G4 Fourth Lens Group
L1 First Lens
L2 Second Lens
L3 Third Lens
L4 Fourth Lens
L5 Fifth Lens
L6 Sixth Lens
L7 Seventh Lens
L8 Eighth Lens
L9 Ninth Lens
L10 Tenth Lens
L11 Eleventh Lens
L12 Twelfth Lens
L13 Thirteenth Lens
CG Parallel Flat Glass
A Aperture Stop
S Image Plane
100 Image Capture Device
101 Imaging Optical System
102 Image Sensor
104 Housing
200 Camera System
201 Camera Body
202 Image Sensor
203 Monitor
204 Camera Mount
205 Viewfinder
300 Interchangeable Lens Unit
302 Lens Barrel
304 Lens Mount

The invention claimed is:

1. An imaging optical system comprising:
a front group having positive power;
an aperture stop;
a single lens Fn arranged adjacent to the aperture stop and having negative power; and
a rear group having power,
the front group, the aperture stop, the single lens Fn, and the rear group being arranged in this order such that the front group is located closer to an object than any of the aperture stop, the single lens Fn, or the rear group is and that the rear group is located closer to an image than any of the front group, the aperture stop, or the single lens Fn is,
the front group including:
a first lens having positive power;
a second lens having negative power; and
a lens LG1R having positive power,
the first lens, the second lens, and the lens LG1R being arranged in this order such that the first lens is located closest to the object and that the lens LG1R is located closest to the image, the rear group including a lens LGnR having negative power and located closest to the image, wherein while the imaging optical system is focusing to make a transition from an infinity in-focus state to a close-object in-focus state, neither the front group nor the rear group moves but the single lens Fn moves along an optical axis toward the image, and the imaging optical system satisfies the following Inequality (1):

$$0.38 < fLG1R/fG1 < 1.75 \quad (1)$$

where fG1 is a focal length of the front group and fLG1R is a focal length of the lens LG1R, and the imaging optical system further comprising another single lens Fp having positive power and arranged between the single lens Fn and the rear group such that the single lens Fp is located adjacent to, and closer to the image than, the single lens Fn and is located adjacent to, and closer to the object than, the rear group, and while the imaging optical system is focusing to make a transition from the infinity in-focus state to the close-object in-focus state, the single lens Fp moves along the optical axis toward the object.

2. The imaging optical system of claim 1 comprising single lenses including the single lens Fn and the single lens Fp, wherein the imaging optical system satisfies the following Inequality (2):

$$0.02 < Lsff/fw < 1.1 \quad (2)$$

where Lsff is a length measured along the optical axis from the aperture stop to a surface, facing the image, of one of the single lenses moving during focusing which is located closer to the image than the other single lens is, and fw is a focal length of the entire imaging optical system.

3. The imaging optical system of claim 1 comprising single lenses including the single lens Fn and the single lens Fp, wherein the imaging optical system satisfies the following Inequality (3):

$$0.029 < Lg1rnf/fw < 0.1 \quad (3)$$

where Lg1rnf is a length measured along the optical axis from a surface, facing the image, of the lens LG1R to a surface, facing the object, of one of the single lenses moving during focusing which is located closer to the image than the other single lens is, and fw is a focal length of the entire imaging optical system.

4. The imaging optical system of claim 1, wherein the imaging optical system satisfies the following Inequality (4):

$$-2.0 < fFn/fw < -0.5 \quad (4)$$

where fFn is a focal length of the single lens Fn and fw is a focal length of the entire imaging optical system.

5. The imaging optical system of claim 1, wherein the front group includes at least one aspheric lens satisfying the following Inequality (5):

$$0.6 < |fLG1a/fG1| < 6.0 \quad (5)$$

where fLG1a is a focal length of the aspheric lens and fG1 is a focal length of the front group.

6. The imaging optical system of claim 1, wherein the front group includes, between the second lens and the lens LG1R, at least one lens LG1ed having positive power and satisfying the following Inequality (6):

$$0.015 < LG1ed\_dPgf \quad (6)$$

where LG1ed_dPgf is anomalous dispersion of the lens LG1ed.

7. The imaging optical system of claim 1, wherein the imaging optical system satisfies the following Inequality (7):

$$2.7 < Fno/fw \times L < 6.0 \quad (7)$$

where Fno is an F number of the imaging optical system, fw is a focal length of the entire imaging optical system, and L is a total optical length from a surface, facing the object, of the first lens in the imaging optical system to an image plane.

8. The imaging optical system of claim 1, wherein the imaging optical system includes at least one positive lens Lp arranged closer to the image than the single lens Fn is and satisfying the following Inequality (8):

$$Lp\_\nu d < 35 \quad (8)$$

where Lp_υd is an abbe number with respect to a d line of the positive lens Lp.

9. A camera system comprising:
an interchangeable lens unit including the imaging optical system of claim 1; and
a camera body including an image sensor configured to receive an optical image formed by the imaging optical system and transform the optical image into an electrical image signal, the camera body being configured to be connected removably to the interchangeable lens unit via a camera mount,
the interchangeable lens unit being configured to form the optical image of the object on the image sensor.

10. An image capture device configured to transform an optical image of an object into an electrical image signal and display and/or store the image signal transformed, the image capture device comprising:
the imaging optical system of claim 1 configured to form the optical image of the object; and
an image sensor configured to transform the optical image formed by the imaging optical system into the electrical image signal.

11. The imaging optical system of claim 2 comprising single lenses including the single lens Fn and the single lens Fp, wherein
the imaging optical system satisfies the following Inequality (3):

$$0.029 < Lg1rnf/fw < 0.1 \quad (3)$$

where Lg1rnf is a length measured along the optical axis from a surface, facing the image, of the lens LG1R to a surface, facing the object, of one of the single lenses moving during focusing which is located closer to the image than the other single lens is, and fw is a focal length of the entire imaging optical system.

* * * * *